(12) United States Patent (10) Patent No.: US 8,333,320 B2
Huot et al. (45) Date of Patent: Dec. 18, 2012

(54) CONTACTLESS ELECTRONIC MICROCIRCUIT DOCUMENT AND PROXIMITY SENSOR

(75) Inventors: Jean-Claude Huot, Rouen (FR); Francis Chamberot, Vanves (FR)

(73) Assignee: Oberthur Technologies, Levallois-Perret (FR)

( * ) Notice: Subject to any disclaimer, the term of this patent is extended or adjusted under 35 U.S.C. 154(b) by 1172 days.

(21) Appl. No.: 12/092,582

(22) PCT Filed: Oct. 31, 2006

(86) PCT No.: PCT/FR2006/002442
§ 371 (c)(1),
(2), (4) Date: May 5, 2008

(87) PCT Pub. No.: WO2007/051922
PCT Pub. Date: May 10, 2007

(65) Prior Publication Data
US 2008/0290160 A1 Nov. 27, 2008

(30) Foreign Application Priority Data
Nov. 4, 2005 (FR) ...................................... 05 11261

(51) Int. Cl.
*G06K 5/00* (2006.01)
(52) U.S. Cl. ........................................ 235/382; 235/492
(58) Field of Classification Search .................... 235/382
See application file for complete search history.

(56) References Cited

U.S. PATENT DOCUMENTS

| | | | | |
|---|---|---|---|---|
| 5,569,868 A * | 10/1996 | Leung | .............................. | 84/600 |
| 6,110,755 A * | 8/2000 | Muramatsu et al. | ............ | 438/26 |
| 7,218,233 B2 * | 5/2007 | Bon | .......................... | 340/572.8 |
| 7,243,840 B2 * | 7/2007 | Bason et al. | ................... | 235/380 |
| 7,701,408 B2 * | 4/2010 | Bombay et al. | ................ | 343/841 |
| 2003/0173408 A1 | 9/2003 | Mosher, Jr. et al. | | |
| 2004/0160748 A1 * | 8/2004 | Takagi et al. | .................. | 361/752 |
| 2005/0077348 A1 | 4/2005 | Hendrick | | |
| 2005/0141987 A1 * | 6/2005 | Steele | ................ | 412/1 |
| 2007/0138297 A1 * | 6/2007 | Sickert et al. | .................. | 235/492 |
| 2007/0194453 A1 * | 8/2007 | Chakraborty et al. | ........ | 257/777 |
| 2009/0220928 A1 * | 9/2009 | Chen et al. | ..................... | 434/317 |

FOREIGN PATENT DOCUMENTS

| | | |
|---|---|---|
| DE | 197 21 057 A1 | 11/1998 |
| EP | 0 735 505 A2 | 10/1996 |
| FR | 2 863 083 A | 6/2005 |
| GB | 2 410 151 A | 7/2005 |

* cited by examiner

*Primary Examiner* — Steven S Paik
*Assistant Examiner* — Tae Kim
(74) *Attorney, Agent, or Firm* — Young & Thompson

(57) ABSTRACT

The document includes a support (10) provided with at least one first (12) and second (14) parts that can move relative to one another, the support including an electronic microcircuit (3) and contactless coupling members (2) electrically connected to the electronic microcircuit (3), and capable of being coupled to an external reading station (5) for establishing a contactless communications with the latter (5). The support also includes detecting elements (20) capable of detecting the relative proximity of the first and second parts independent of the contactless coupling members (2), and securing elements (30) connected to the detecting elements (20) and capable of inhibiting and/or authorizing the activation of the contactless communication according to the relative proximity of the first and second parts thus detected.

30 Claims, 2 Drawing Sheets

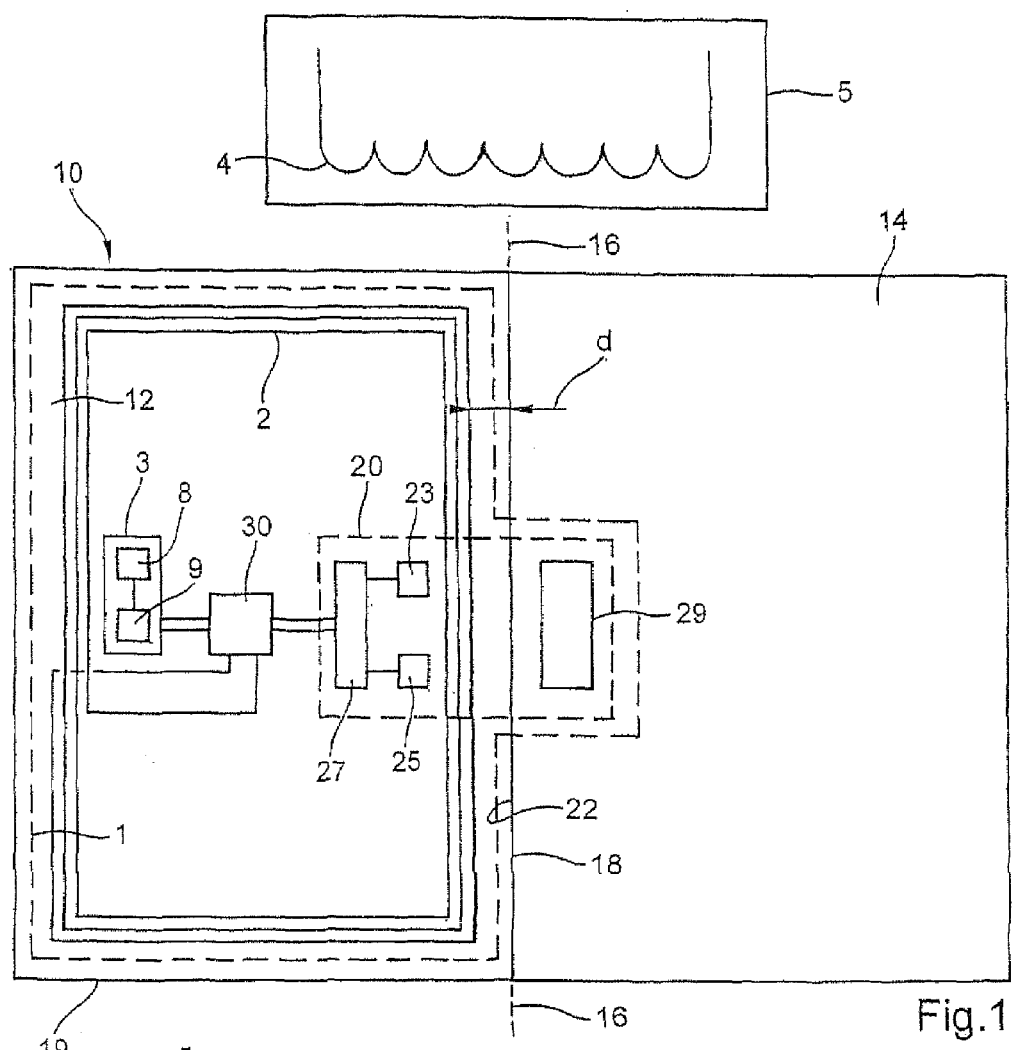
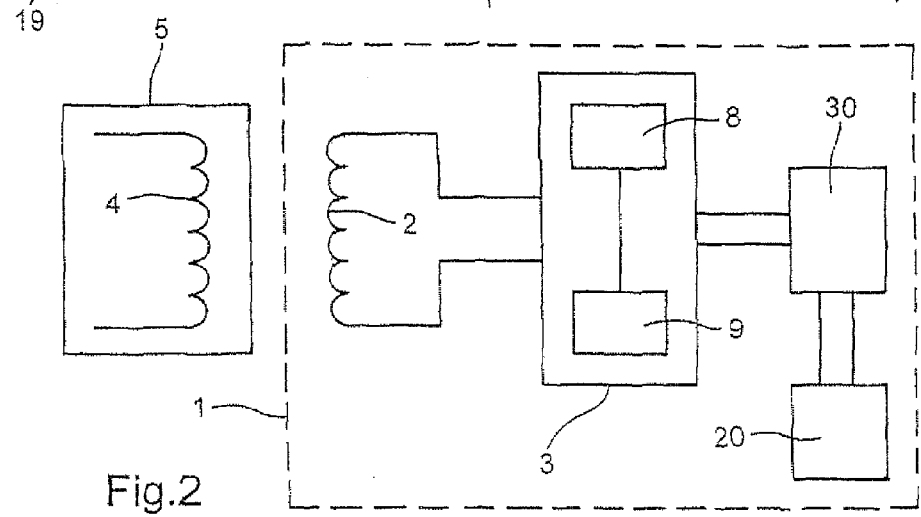

CONTACTLESS ELECTRONIC MICROCIRCUIT DOCUMENT AND PROXIMITY SENSOR

The present invention concerns making secure the operation of an electronic microcircuit document using the contactless communication technology, as described in the ISO standard 14443, for example.

It also concerns an electronic entity including a contactless electronic microcircuit integrated into a support, such as a passport, driver's license or, more generally, an identity document that a bearer may be required to show at the time of identity checks.

It also concerns a document in two parts mobile relative to each other, which can be independent and not connected to each other, or foldable or mobile in translation.

It also concerns a document consisting of two parts each formed of a card conforming to the ISO standard 7816 and connected to each other flexibly by one of their sides.

It finds an application in the contactless communication technology and in the dual or hybrid technology, in which case the electronic device further includes a contact communication interface.

BACKGROUND OF THE INVENTION

It has already been proposed to integrate into a security document, in practice including printed data intended to enable an identity check, a contactless electronic device, for example a microprocessor-based integrated circuit, intended to communicate with the external environment by means of an antenna, in such a manner as to enable contactless exchange of information between the document and an external control station. Data is typically exchanged at the initiative of the reader (the reader sends commands to which the contactless electronic device responds).

This kind of security document exchanges data that is richer in information than printed characters or even a photo, such as biometric data, and where appropriate verifies the compatibility of the printed data and the stored data, so as to detect any attempt to corrupt the printed data.

Nevertheless, this principle of contactless reading of data contained in the integrated circuit encounters entirely understandable resistance on the grounds that the data can be read unknown to the bearer, by systems that may be unauthorized.

Solutions for preventing such inopportune reading are already known.

For example, the document WO-2005/045754 identifies two reference positions of the document, for example "open" and "closed" positions, and provides for the data to be readable only in one or the other of those positions. To this end, the integrated circuit is connected to at least one element for coupling it to the outside environment which is capable, depending on the configuration of the security document, of exchanging information with the external environment or not. In the aforementioned document, the coupling element is an antenna produced on two sheets: depending on the geometry of this antenna and the instantaneous configuration of the document, the coupling element is operative or not. In a first embodiment, the antenna comprises turns each formed in part on each of said sheets, this antenna enabling exchange when the document is open (the turns have a maximum exchange section), whereas when the document is closed the halves of each turn are superposed so that they conjointly define a zero section, preventing any exchange with the external environment. A converse situation is obtained when the antenna is produced in the shape of the digit 8, with the antenna tracks crossing over on the fold line between the sheets: in this configuration, data can be exchanged only when the document is closed.

This kind of security document has the drawback of requiring a flexible electrical connection between the two sheets, which is costly to produce and gives rise to reliability problems.

Moreover, the security of the operation of this kind of document is not totally satisfactory in the presence of a reader station of high electromagnetic power.

SUMMARY OF THE INVENTION

The present invention provides a solution to precisely this problem.

It relates to a document including a support provided with at least first and second portions mobile relative to each other, the support including an electronic microcircuit and contactless coupling means electrically connected to said electronic microcircuit, and adapted to be coupled to an external reader station to set up contactless communication with the latter station.

According to a general definition of the invention, the support further comprises detector means adapted to detect the relative proximity of the first and second portions independently of the contactless coupling means and security means connected to said detector means and adapted to inhibit and/or to authorize activation of contactless communication as a function of said relative proximity of the first and second portions detected in this way.

According to the invention, the operation of the contactless electronic microcircuit is reliably secure even in the presence of an external reader station of high electromagnetic power. The detection of the relative proximity of the two parts of the support, which commands the security means to inhibit and/or to authorize activation of contactless communication, is implemented in accordance with the invention independently of the contactless coupling means. This is a fundamental difference from known solutions that use the contactless coupling means, or the signals coming from said contactless coupling means, directly. The result of this is improved security against inopportune reading in the presence of a high electromagnetic power radiated in the vicinity of the document.

In one embodiment, the electronic microcircuit comprises storage means adapted to store sensitive and/or personal data and the security means are adapted to inhibit and/or to authorize reading and/or writing of sensitive and/or personal data in said storage means as a function of the relative proximity of the first and second portions detected in this way. The invention therefore improves security against inopportune reading and/or writing of sensitive data contained in the electronic microcircuit.

According to preferred features of the invention, where appropriate combined:
- the contactless coupling means are of inductive type,
- alternatively, the contactless coupling means are of capacitive type,
- the first and second portions have a substantially plane surface, the detector means being adapted to detect the relative proximity of the substantially plane surfaces of the first and second portions,
- the first and second portions of the support are independent and not connected to each other,
- the document is foldable and the first and second portions are adapted to pivot relative to each other about a fold axis along edges of said first and second portions, the second portion of the support is mobile relative to the first portion along a chosen translation axis, the first and second portions of the support are permanently connected to each other, the first and second portions of the support are temporarily connected to each other.

With regard to the detector means, the implementation whereof is independent of the contactless coupling means, said detector means can be of different types:

the detector means are Hall effect proximity sensors adapted to detect a magnetic flux between the first and second portions and the security means are adapted to inhibit and/or to authorize activation of contactless communication when the magnetic flux between the first and second portions reaches a predetermined threshold corresponding to a predetermined relative position of the first and second portions of the support, the detector means are capacitive proximity sensors adapted to detect opening and/or closing of a circuit established between the first and second portions and the security means are adapted to inhibit and/or to authorize activation of contactless communication as a function of the opening and/or closing of an established circuit detected in this way corresponding to a predetermined relative position of the first and second portions, the detector means are photosensitive proximity sensors adapted to detect brightness between the first and second portions and the security means are adapted to inhibit and/or to authorize activation of contactless communication when the brightness between the first and second portions reaches a predetermined threshold corresponding to a predetermined relative position of the first and second portions, the detector means comprise an inductive proximity sensor adapted to detect the inductance between the first and second portions and the security means are adapted to inhibit and/or to authorize activation of contactless communication when the inductance detected in this way reaches a predetermined threshold corresponding to a predetermined relative position of the first and second portions.

According to other preferred features of the invention, where appropriate combined:

the contactless communication conforms to the ISO standard 14443, the operating frequency of the electronic microcircuit is approximately 13.56 MHz, the contactless coupling means, the security means, the detector means and the microcircuit are all supported by the first portion of the support, which facilitates the implementation of the invention, the security means, and where applicable the detector means, are an integral part of the electronic microcircuit, which further facilitates the implementation of the invention, alternatively the security means, and where applicable the detector means, are part of a circuit separate from the electronic microcircuit, alternatively the security means, and where applicable the detector means, are part of a circuit separate from the electronic microcircuit and are supported by the second portion of the support, the security means are supplied with electrical power by the contactless coupling means and are adapted to cut off the power supply of the electronic microcircuit as a function of the relative proximity of the first and second portions detected in this way, alternatively, the security means are supplied with electrical power by the microcircuit and are adapted to send an inhibition and/or authorization signal to the microcircuit to inhibit and/or to authorize activation of contactless communication as a function of the relative proximity of the first and second portions detected in this way, the detector means extend along the edge of the first portion along the fold axis, the geometrical center of the detector means is placed in the first quarter of the first portion situated relatively close to the fold axis, and the detector means are more particularly situated on the first portion at a distance from the fold axis between 2 and 15 mm, which improves detection quality in the case of a small angle, the first and second portions are stitched together, the detector means being disposed in the proximity of the stitches, the electronic microcircuit and the security means are mounted on the support during the same assembly step, which facilitates assembly of the component parts of the document according to the invention, the contactless coupling means, the connections between the detector means, the security means and the electronic microcircuit, and at least certain portions of the detector means are produced at the same time and by the same fabrication process, which can be of the etching, screen-printing or electrolytic deposition type, which further facilitates production of the elements of the document of the invention and, as a corollary, makes it less costly to produce, the electronic microcircuit and the security means are produced by different microelectronic technologies, which makes the invention less costly to implement alternatively, the electronic microcircuit and the security means are produced by identical microelectronic technologies, the first and second portions of the support are preferably identical.

In practice the document belongs to the group formed by security documents, identity documents, passports, drivers' licenses.

The document is produced in a fibrous material, for example.

The present invention also consists in an electronic entity comprising a support provided with at least first and second portions mobile relative to each other, the support including an electronic microcircuit and contactless coupling means electrically connected to said electronic microcircuit, and adapted to be coupled to an external reader station to establish contactless communication with the latter station.

According to another aspect of the invention, the support further comprises detector means adapted to detect the relative proximity of the first and second portions independently of the contactless coupling means and the security means connected to said detector means and adapted to inhibit and/or to authorize activation of contactless communication as a function of said relative proximity of the first and second portions detected in this way.

The present invention finally consists in a method of controlling exchange of information between a document and an external reader station, said document comprising a support provided with at least first and second portions mobile relative to each other, the support including an electronic microcircuit and contactless coupling means electrically connected to said electronic microcircuit, and adapted to be coupled to an external reader station to establish contactless communication with the latter station.

According to another aspect of the invention, the support is provided with proximity detector means for detecting the relative proximity of the first and second portions and security means connected to said proximity detector means, the relative proximity of the first and second portions is detected independently of the contactless coupling means, and activation of contactless communication is inhibited and/or authorized as a function of said relative proximity of the first and second portions detected in this way.

BRIEF DESCRIPTION OF THE DRAWINGS

Other features and advantages of the invention will become apparent in the light of the following detailed description and from the drawings, in which:

FIG. 1 represents diagrammatically a foldable document according to the invention in the open position;

FIG. 2 represents diagrammatically a different embodiment of the document according to the invention.

DETAILED DESCRIPTION OF THE PREFERRED EMBODIMENTS

Figure 3:
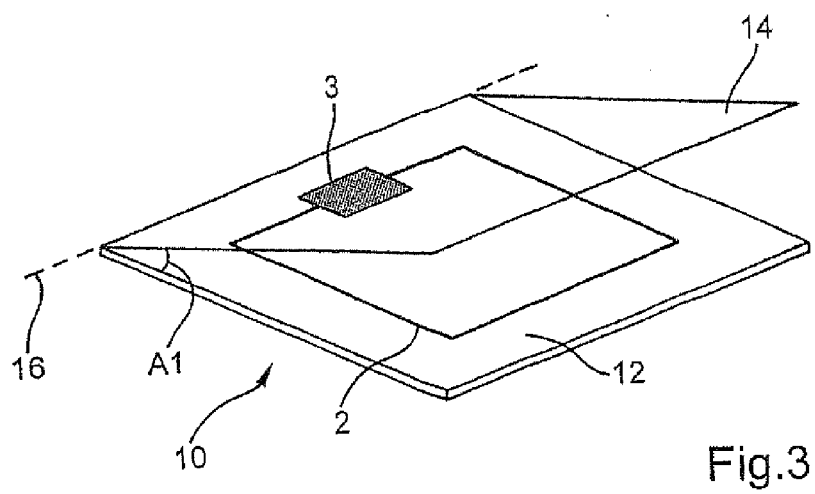
FIGS. 3 and 4 represent diagrammatically a foldable document, respectively open to a small angle and open to a large angle.

The following description is given with reference to a security document forming a passport consisting of a number of sheets connected to each other along a folding axis. Obviously this description based on a passport is in no way limiting on the invention and it can apply to other security documents, such as a driver's license, an identity card, a transport ticket, a subscription ticket, an access control document, a title consisting of two parts each formed of a card conforming to the ISO standard 7816 and connected to each other flexibly by one of their sides.

The security document is not necessarily foldable. It can comprise two parts that are moved relative to each other, for example along a chosen translation axis.

The two portions of the document mobile relative to each other can also be independent and not connected to each other.

Referring to FIG. 1, the document comprises a support 10 having at least first and second portions 12, 14 mobile relative to each other. The document can be folded and the portions 12 and 14 pivot relative to each other about a folding axis 16 along the edges 18 and 22 of the portion 12 and the portion 14, respectively.

The portions 12 and 14 can occupy a plurality of positions between a "closed" position in which said portions 12 and 14 are superposed and form between them an angle of 0° and an "open" position in which these portions form between them an angle greater than or equal to 90°.

In FIG. 3, the angle A1 is of the order of 20°, corresponding to the support 10 slightly open.

Figure 4:
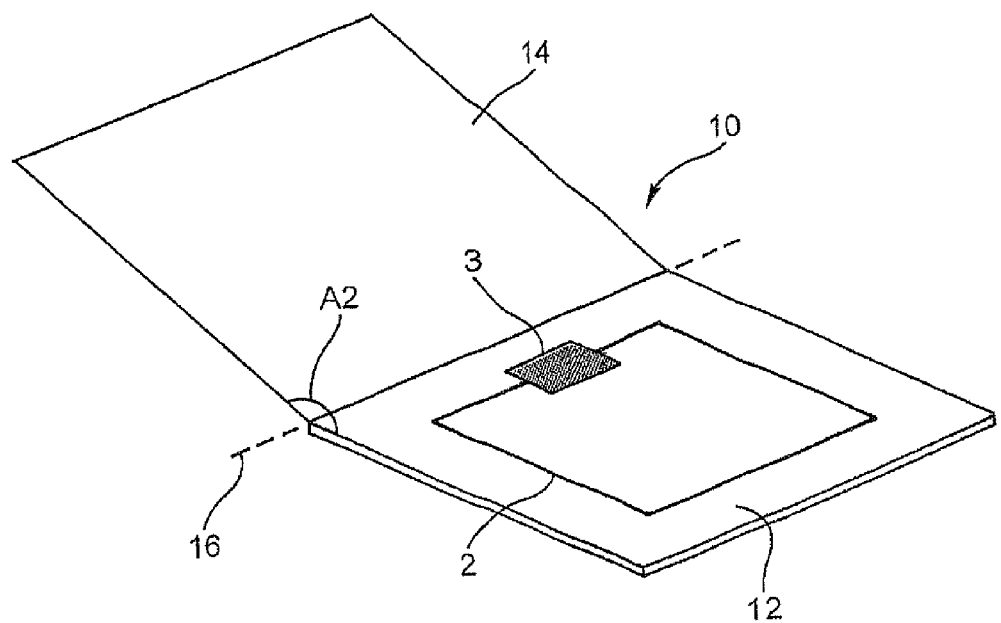

In FIG. 4, the angle A2 is of the order of 140°, corresponding to the support 10 wide open.

Refer again to FIG. 1. The first portion 12 includes a contactless electronic device 1 conforming to the ISO standard 14443.

The contactless electronic device 1 includes an electronic microcircuit 3 and contactless coupling means 2 electrically connected to said electronic microcircuit 3.

The contactless coupling means are preferably of the inductive type and adapted to be coupled magnetically to an external reader station 5 to establish contactless communication with the inductive element 4 of the latter station 5.

In practice, the inductive coupling means 2 comprise an antenna supported by the first portion 12 of the support 10.

For example, the antenna 2 comprises a conductive winding connected to the electronic microcircuit 3. The conductive winding can comprise one or more turns.

Alternatively, the contactless coupling means 2 are of capacitive type.

For its part, the electronic microcircuit 3 is, for example, a secure microcontroller conventionally having a CPU type processor unit 8 and RAM, ROM and/or EEPROM memories 9, all connected to a data bus and to an input/output interface.

The portions 12 and 14 can form the cover of the document including a plurality of sheets interleaved between the two inside faces of the cover. Alternatively, they can constitute any sheet of said document. The portions 12 and 14 of the support 10 are preferably contiguous and touch when the support is closed.

For example, the dimensions of the passport are 125×90 mm. Once closed, the thickness of the passport is of the order of 2 mm.

In practice, the contactless electronic device 1 is mounted in the thickness of the first portion 12 of the support 10.

For example, the electronic microcircuit 3 operates at a frequency lower than 100 MHz, in particular between 13 and 15 MHz, preferably 13.56 MHz.

In the situation corresponding to portions 12 and 14 consisting of two cards with a format conforming to the ISO standard 7816, the bearer will be protected from fraudulent reading by keeping the two cards superposed on each other, for example in their wallet.

For example, the right-hand edge of the antenna 2 is situated at a distance d from the folding axis 16 between 2 and 15 mm, typically 5 mm, in particular to improve the reliability of the mounting of the various electronic elements of the contactless electronic device of the invention.

The countermeasure preventing fraudulent reading of the document by the reader station 5, which is known as anti-skimming, is implemented by the detector means 20 described in more detail hereinafter that detect the relative proximity of the two portions 12 and 14 of the support 10 and are connected to security means 30 for inhibiting and/or authorizing activation of contactless communication as a function of the relative proximity detected in this way, without calling on the contactless coupling means. As a result of this the operation of the document is invulnerable in the presence of a high electromagnetic power radiated in the vicinity of the document.

Referring to FIG. 1, the security means 30 are connected and supplied with power electronically by the contactless coupling means 2. The security means 30 can cut off the power supply from the microcircuit 3 as a function of the relative proximity of the two portions 12 and 14 detected in this way by the detector means 20.

Alternatively (FIG. 2), the security means 30 are connected and supplied with power electronically by the microcircuit 3. As a function of the relative proximity of the two portions 12 and 14 of the support 10 detected in this way by the detector means 20, the security means 30 send the microcircuit 3 an inhibiting and/or authorization signal for inhibiting and/or authorizing activation of contactless communication as a function of the relative proximity of the first and second portions 12 and 14 detected in this way.

In practice, the storage means 9 of the microcircuit 3 are adapted to store sensitive and/or personal data. The security means 30 therefore inhibit and/or authorize reading and/or writing of sensitive and/or personal data in said storage means 9 as a function of the relative proximity of the two portions 12 and 14 of the support 10 detected in this way. For example, the sensitive data is identification data such as passport serial numbers, bearer nationality, photograph, passport expiry date, etc.

Clearly proximity sensors independent of the contactless coupling means 12 can detect the relative proximity of the two portions 12 and 14 of the support 10.

Here references to the relative proximity of the two portions 12 and 14 of the support 10 mean a geometrical configuration of these two portions 12 and 14, in particular their relative position, especially the angle between them in the case of a document that can be folded (FIGS. 3 and 4).

In a first embodiment as shown in FIG. 1, the detector means are capacitive sensors. This kind of sensor detects the opening and/or the closing of a circuit established between the first and second portions 12 and 14 of the support 10.

For example, the capacitive sensor 20 comprises a current generator 27 and an arrangement of capacitors distributed over the first portion 12 and the second portion 14 to form with the generator 27 a circuit that is open or closed according to the angle to which the document is open.

For example, two capacitors or capacitor plates 23 and 25 are disposed on the side of the first portion 12 of the support 10 and a capacitor 29 is disposed on the side of the second portion 14 of the support 10, facing the capacitors 23 and 25 when the foldable document is closed.

As explained in more detail hereinafter, the capacitor plates 23, 25, 29 can be produced in conductive ink, for example.

The elements 20 and 30 (excluding the capacitor 29) are preferably disposed inside the perimeter defined by the winding of the antenna 2.

If it is assumed that the capacitors 23, 25 and 29 form with the generator 27 a closed circuit when the foldable document is closed and an open circuit when the document is open, it is clear that the current that flows in the circuit concerned changes and that how it changes is a function of the relative proximity of the two portions 12 and 14 of the document.

It is therefore clear that, by measuring a physical magnitude linked to the current flowing in the circuit concerned, it is possible to detect the relative position of the two portions 12 and 14 of the document, in particular the angle between them.

Thus a simple current measurement indicates whether the portions 12 and 14 are superposed (i.e. the document is closed) or not: when the portions 12 and 14 are superposed, then the current is a non-zero current, and a zero current indicates that the document is open.

This kind of measurement is entirely obvious to the person skilled in the art.

Alternatively, it can be preferable for the capacitive test to involve a threshold value other than a zero/non-zero current.

In another variant, the current generator 27 is replaced by feeding a current from the electronic microcircuit 3 and/or the coupling means 2.

The capacitive sensor 20 is connected to the security means 30 which, in response to the capacitive test, inhibit and/or authorize activation of contactless communication either in accordance with the embodiment described with reference to FIG. 1 or in accordance with the embodiment described with reference to FIG. 2.

As a function of the capacitive test, the security means 30 enable the electronic microcircuit 3 to initiate the procedure for exchange with the external environment or not. If the test is satisfied, the exchange procedure is initiated and can in practice continue to the end, as long as the document remains in the field of the reader station, even if the geometrical condition (or the relative position of the two portions) ceases to be complied with.

It goes without saying that this test is advantageously verified by the electronic microcircuit itself although the test can instead be verified by a dedicated circuit.

It is obvious to the person skilled in the art how to adapt the shape, location and number of capacitors and to choose an appropriate threshold for a relative proximity of the two portions, in particular an angle between them in the case of a foldable document.

In a second embodiment that is not shown, the detector means 20 are Hall effect proximity sensors.

This kind of sensor detects a magnetic flux between the first and second portions 12 and 14.

For example, the Hall effect proximity sensor comprises a magnet disposed on the second portion 14 while facing it (when the two portions are superposed on each other), the first portion 12 comprises another magnet and a Hall effect cell, for example of the type sold by Siemens under the product references TLE4921-3U and TLE4923 or by Microsystems under the product references UGN3503LT, UGN3503U and UGN3503UA.

When the magnetic flux between the first and second portions 12, 14 reaches a predetermined threshold corresponding to a predetermined relative position of the first and second portions 12 and 14 of the support 10, the Hall effect cell sends a signal to the security means 30, which in response inhibit and/or authorize activation of contactless communication either in accordance with the embodiment described with reference to FIG. 1 or in accordance with the embodiment described with reference to FIG. 2.

It is obvious to the person skilled in the art how to adapt the aforementioned Hall effect cells and to choose an appropriate threshold for a relative proximity of the two portions, in particular an angle between them in the case of a foldable document.

Apart from the magnetic element or elements producing the magnetic field used by the Hall effect sensor, all components, namely the Hall effect cell 20 and the security means 30, can be integrated into the microcircuit 3 and disposed on the first portion 12 of the support 10 at an appropriate location facing that of the magnet producing the magnetic field.

Alternatively, the Hall effect detection function 20 and the security function 30 can be implemented by one or more dedicated circuits disposed on the first portion 12, on the second portion 14 of the support 10, or distributed over one or the other of these two portions 12 and 14.

It will be noted that this kind of Hall effect proximity sensor 20 is totally independent of the contactless coupling means 2, which makes this kind of detection and the resulting security invulnerable in the presence of a high electromagnetic power radiated in the proximity of the document.

Moreover, no connection is required between the first and second portions of the support.

The Hall effect detector means 20 are preferably placed in the first quarter of the first portion 12 situated relatively close to the fold axis 16 and more particularly at a distance d from the fold axis 16 between 2 and 15 mm.

When the first and second portions 12, 14 are stitched together, the detector means 20 are advantageously disposed in the proximity of the stitches to facilitate capture in the case of a small angle between them at the same time as avoiding damaging the components on folding.

In a third embodiment the detector means 20 are photosensitive proximity sensors.

For example, the proximity sensor comprises a cell disposed on the first portion and able to detect brightness between the first and second portions 12, 14 of the support 10.

In practice, the second portion is at least partially opaque at the location facing the cell 20.

When the brightness between the first and second portions 12, 14 reaches a predetermined threshold corresponding to a predetermined relative position of the first and second portions 12, 14 of the support 10, the photosensitive cell 20 (of CMOS or other technology) sends a signal to the security means 30 which in response inhibit and/or authorize activation of contactless communication. The security means 30 and the cell 20 can be produced either in accordance with the embodiment described with reference to FIG. 1 or in accordance with the embodiment described with reference to FIG. 2.

It is obvious to the person skilled in the art how to adapt the photosensitive cells and to choose an appropriate threshold for a relative proximity of the two portions, in particular an angle between them in the case of a foldable document.

The photosensitive cell 20 and the security means 30 can be integrated into the microcircuit 3 and disposed on the first portion 12 of the support 10 at an appropriate location facing an opaque location of the second portion 14 of the support 10 (FIGS. 3 and 4).

Alternatively, the photosensitive detection function 20 and the security function 30 can be implemented by one or more dedicated circuits disposed on the first portion 12 of the support 10, on the second portion 14 of the support 10, or distributed over one or the other of these two portions 12 and 14.

It will also be noted that this kind of photosensitive sensor is totally independent of the inductive coupling means 2, which makes such detection and the resulting security totally invulnerable in the presence of a high electromagnetic power radiated in the proximity of the document.

Moreover, no connection is required between the first and second portions 12, 14 of the support.

In a fourth embodiment (not shown), the detector means 20 comprise an inductive proximity sensor. For example, the proximity sensor comprises a measuring device able to measure the inductance between the conductive winding 2 situated on the first portion 12 and a conductive winding situated on the second portion 14. When the inductance measured in this way between the first and second portions 12, 14 reaches a predetermined threshold corresponding to a predetermined relative position of the first and second portions 12, 14 of the support 10, the inductance measuring device sends a signal to the security means which in response inhibit and/or authorize activation of contactless communication. It is obvious to the person skilled in the art how to adapt the inductance measuring device and to choose an appropriate threshold for a relative proximity of the two portions, in particular a predetermined angle between them in the case of a foldable document.

In fabrication mode, the electronic microcircuit 3 and the security means 30 can be mounted on the support 10 in the same assembly step, which simplifies and facilitates assembly.

The security means 30 and where appropriate the detector means 20 can advantageously be produced using a technology (printed circuit technology, for example) that is simpler and less costly than that used for the electronic microcircuit 3 (CMOS technology, for example). Alternatively, the electronic microcircuit 3 and the security means 30 are produced using identical microelectronic technologies.

Generally speaking, the detector means, the security means, the contactless coupling means and the electronic microcircuit can be inserted into the thickness of at least a portion of the support.

It should also be specified that the connections between the various elements 3, 20 and 30 and where appropriate a portion of the elements constituting the detector means 20 can advantageously be produced at the same time and by the same fabrication process. For example, the fabrication process is of the screenprinting, etching or electrolytic deposition type. For example, the antenna 2, the connections and the capacitor plates 23, 25, 29 are made of copper (produced by etching a layer of copper previously deposited on the support) or by a screenprinted conductive ink. For example, this all applies to a first sheet and is then followed by mounting the elements 3, 20 and 30 on this first sheet, for example by the flip chip process. Finally, the resulting first sheet is laminated at least with a second sheet to form the portion of the corresponding support.

Finally, it should be noted that the detector means and the security means can be added to an electronic microcircuit already installed in the document.

In the case of a foldable document in which the first and second portions 12, 14 are stitched together, the detector means 20 are disposed in the proximity of the stitches to enable reliable detection even in the case of a small angle between them.

Note that the configuration the number and the distribution of the antennas forming the contactless coupling means are here not essential features of the invention in that it is precisely the detector means that constitute proximity sensors that detect relative proximity of the two portions of the document independently of said contactless coupling means.

The invention claimed is:

1. An electronic entity comprising:
a support, provided with at least a first portion and a second portion mobile relative to each other, the first portion of the support including an electronic microcircuit and contactless coupling means electrically connected to said electronic microcircuit and adapted to be coupled to an external reader station to establish contactless communication with said external reader station,
the first portion of the support further comprising at least a part of a detector means adapted to detect a relative proximity of the first portion and the second portion independently of the contactless coupling means,
the first portion of the support further comprising a security means connected to said detector means and to the contactless coupling means and/or the microcircuit, and adapted to inhibit and/or to authorize activation of a contactless communication between the contactless coupling means and an external reader station as a function of said relative proximity of the first portion and the second portion detected in this way by the detector means, whereby the bearer of the document is protected from fraudulent reading by contactless communication when the two portions are superposed,
wherein the detector means comprises a part on the second portion of the support without any electrical connection with a first part on the first portion, the detector means being selected from the group consisting of Hall effect proximity sensors, capacitive proximity sensors, and inductive proximity sensors.

2. The electronic entity according to claim 1, wherein the electronic microcircuit comprises storage means adapted to store sensitive and/or personal data and wherein the security means are adapted to inhibit and/or to authorize reading and/or writing of such sensitive and/or personal data in said storage means as a function of the relative proximity of the first and second portions detected in this way.

3. The electronic entity according to claim 1, wherein the first and second portions have each a substantially plane surface, the detector means being adapted to detect the relative proximity of the substantially plane surfaces of the first and second portions.

4. The electronic entity according to claim 3, wherein the first and second portions are adapted to pivot relative to each other about a fold axis along edges of said first and second portions.

5. The electronic entity according to claim 4, wherein the detector means extend along the edge of the first portion along the fold axis.

6. The electronic entity according to claim 4, wherein a geometrical center of the detector means is placed in the first quarter of the first portion situated relatively close to the fold axis.

7. The electronic entity according to claim 4, wherein the first and second portions are stitched together, the detector means being disposed in the proximity of the stitches.

8. The electronic entity according to claim 3, wherein the detector means are Hall effect proximity sensors adapted to detect a magnetic flux between the first and second portions and wherein the security means are adapted to inhibit and/or to authorize activation of contactless communication when the magnetic flux between the first and second portions reaches a predetermined threshold corresponding to a predetermined relative position of the first and second portions of the support.

9. The electronic entity according to claim 3, wherein the detector means are capacitive proximity sensors adapted to detect opening and/or closing of a circuit established between the first and second portions (and wherein the security means are adapted to inhibit and/or to authorize activation of contactless communication as a function of the opening and/or closing of the circuit detected in this way corresponding to a predetermined relative position of the first and second portions.

10. The electronic entity according to claim 3, wherein the detector means comprise an inductive proximity sensor adapted to detect the inductance between the first and second portions, and wherein the security means are adapted to inhibit and/or to authorize activation of contactless communication when the inductance detected in this way reaches a predetermined threshold corresponding to a predetermined relative position of the first and second portions.

11. The electronic entity according to claim 1, wherein the first portion and the second portion of the support consist of cards which are independent and not connected to each other.

12. The electronic entity according to claim 1, wherein the second portion of the support is mobile relative to the first portion along a chosen translation axis.

13. The electronic entity according to claim 1, wherein the first and second portions of the support are permanently connected to each other.

14. The electronic entity according to claim 1, wherein the first and second portions of the support are temporarily connected to each other.

15. The electronic entity according to claim 1, wherein the contactless communication conforms to the ISO standard 14443.

16. The electronic entity according to claim 15, wherein an operating frequency of the electronic microcircuit is approximately 13.56 MHz.

17. The electronic entity according to claim 1, wherein the security means are part of a circuit separate from the electronic microcircuit and are supported by the second portion of the support.

18. The electronic entity according to claim 1, wherein the security means are supplied with electrical power by the contactless coupling means and are adapted to cut off the power supply of the electronic microcircuit as a function of the relative proximity of the first and second portions detected in this way.

19. The electronic entity according to claim 1, wherein the security means are supplied with electrical power by the microcircuit and are adapted to send an inhibition and/or authorization signal to the microcircuit to inhibit and/or to authorize activation of contactless communication as a function of the relative proximity of the first and second portions detected in this way.

20. The electronic entity according to claim 1, wherein the electronic microcircuit and the security means are mounted on the support during a same assembly step.

21. The electronic entity according to claim 1, wherein the contactless coupling means, connections between the detector means, the security means and the electronic microcircuit, and at least portions of the detector means are produced at a same time and by a same fabrication process.

22. The electronic entity according to claim 21, wherein the fabrication process is one of the group consisting of etching, screen printing, and electrolytic deposition.

23. The electronic entity according to claim 1, wherein the electronic microcircuit and the security means are produced by different microelectronic technologies.

24. The electronic entity according to claim 1, wherein the electronic microcircuit and the security means are produced by identical microelectronic technologies.

25. The electronic entity according to claim 1, wherein the first and second portions of the support are contiguous.

26. The electronic entity according to claim 1, wherein the electronic entity forms any of the group consisting of a security document, an identity document, a passport, and a drivers' license.

27. The electronic entity according to claim 26, further comprising a plurality of sheets interleaved between said first and second portions.

28. The electronic entity according to claim 26, constituting a passport.

29. The electronic entity according to claim 1, wherein the support is produced in a fibrous material.

30. The electronic entity according to claim 1, wherein the electronic circuit and at least a part of the detector means are located within the coupling means.

* * * * *